United States Patent [19]
Nijander et al.

[11] Patent Number: 5,387,269
[45] Date of Patent: Feb. 7, 1995

[54] METHODS FOR MAKING PLANAR WAVEGUIDES WITH REMOVAL OF A SACRIFICAL MEMBER WHICH SURROUNDS THE CORE

[75] Inventors: Casimir R. Nijander, Lawrenceville; Wesley P. Townsend, Princeton; Yiu-Huen Wong, Summit, all of N.J.

[73] Assignee: AT&T Bell Laboratories, Murray Hill, N.J.

[21] Appl. No.: 115,628

[22] Filed: Sep. 3, 1993

[51] Int. Cl.⁶ .............................................. C03C 15/00
[52] U.S. Cl. ...................................... 65/386; 65/60.8; 65/60.1; 65/31; 385/129; 385/130; 385/132
[58] Field of Search ................ 65/31, 3.11, 3.12, 60.8, 65/60.1; 385/129, 130, 132

[56] References Cited

U.S. PATENT DOCUMENTS

| | | | |
|---|---|---|---|
| 4,709,986 | 12/1987 | Hicks | 65/3.11 |
| 4,932,989 | 6/1990 | Presby | 65/2 |
| 5,064,266 | 11/1991 | Sun | 385/132 |
| 5,125,054 | 6/1992 | Ackley | 385/130 |
| 5,165,959 | 11/1992 | Burack et al. | 427/162 |
| 5,182,787 | 1/1993 | Blonder et al. | 385/131 |
| 5,198,008 | 3/1993 | Thomas | 65/31 |
| 5,253,319 | 10/1993 | Bhagavatula | 385/130 |

FOREIGN PATENT DOCUMENTS

| 11708 | 1/1986 | Japan | 385/132 |
|---|---|---|---|

OTHER PUBLICATIONS

"Glass Waveguides on Silicon for Hybrid Optical Packaging," by C. H. Henry et al. *Journal of Lightwave Technology*, vol. 7, No. 10, Oct. 1989, pp. 1530-1539.

"Tapered-Beam Expander for Single-Mode Optical-Fibre Gap Devices," K. P. Jedrzejewski et al., *Electronics Letters*, vol. 22, No. 2, Jan. 16, 1986, pp. 105-106.

*Primary Examiner*—W. Gary Jones
*Assistant Examiner*—John Hoffmann
*Attorney, Agent, or Firm*—Roderick B. Anderson

[57] ABSTRACT

An optical waveguide is made by forming successively of light transmitting material a first clad layer (13), a core layer (15) and a second clad layer (18). The core layer has a higher refractive index than that of the first and second clad layers such that the core layer (15) can transmit light along its length as an optical waveguide. A sacrificial layer (14, 17) is formed surrounding at least a first end potion of the core layer. The sacrificial layer is selectively removed as by selective etching such that the first end portion of the core layer is separated from the first and second clad layers. With the end portion so isolated, a lens (22) can be formed on it such that light may be more effectively coupled to or from the core layer. Preferably, the lens is formed by heating the structure sufficiently to form a meniscus on the free end and then cooling it before the reminder of the core layer flows or melts. The cooling hardens the meniscus such that it constitutes an optical lens.

6 Claims, 1 Drawing Sheet

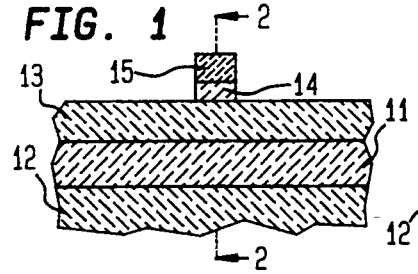 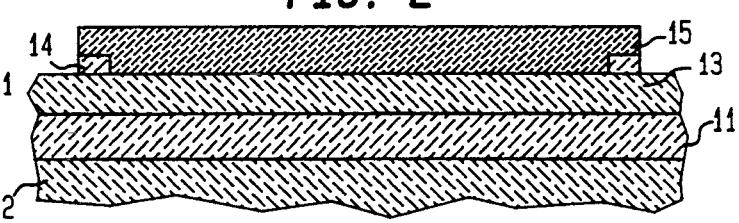
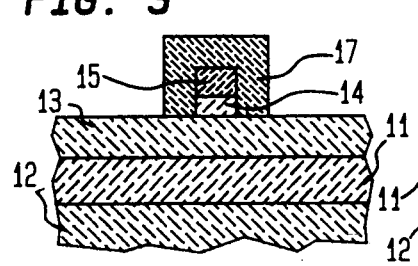 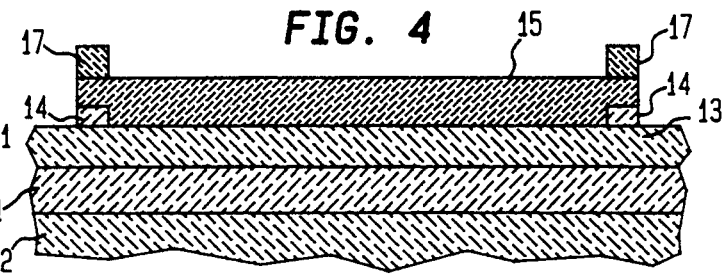
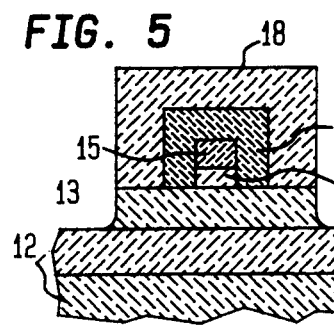 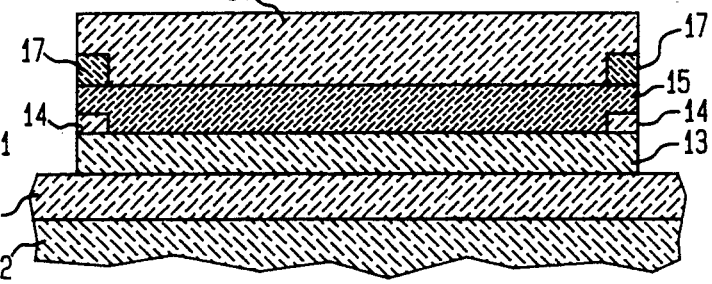
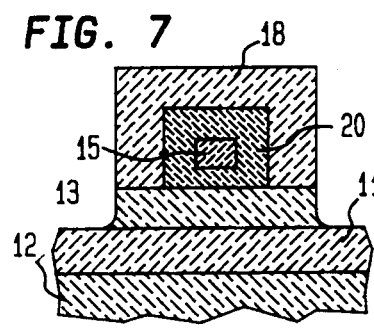 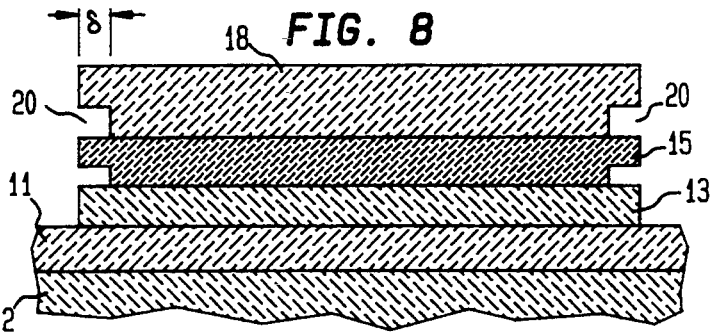
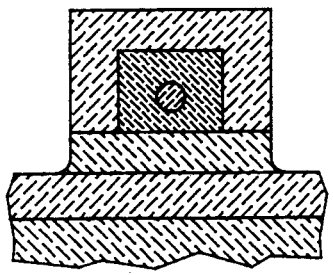 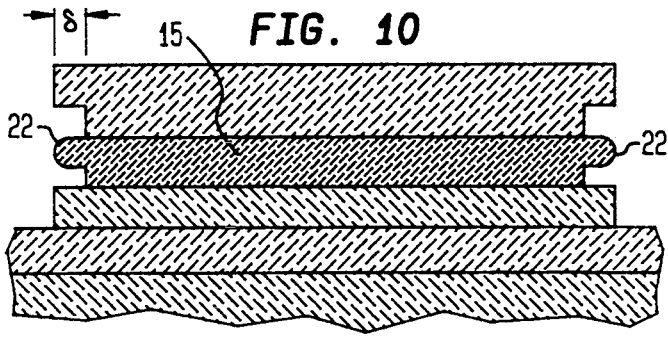

the page number 5,387,269

METHODS FOR MAKING PLANAR WAVEGUIDES WITH REMOVAL OF A SACRIFICAL MEMBER WHICH SURROUNDS THE CORE

TECHNICAL FIELD

This invention relates to methods for making optical waveguides and, more particularly, to methods for making lenses on the ends of planar optical waveguides.

BACKGROUND OF THE INVENTION

Considerable research and development work has been done to develop convenient techniques for operating on transmitted information-carrying light to produce various device functions. Devices known variously as hybrid optical integrated circuits, photonics modules and hybrid optical packages have been proposed for controlling light using planar waveguides that transmit light in a manner similar to the transmission of electricity by the electronic circuit patterns of printed circuits and integrated circuits.

The paper, "Glass Waveguides on Silicon for Hybrid Optical Packaging," C. H. Henry et al., Journal of Lightwave Technology, Vol. 7, No. 10, October 1989, pp. 1530–1539, and the patent of Blonder et al., U.S. Pat. No. 5,182,787, granted Jan. 26, 1993, are examples of the literature describing methods for making and using planar optical waveguides. Such methods generally use successive layers of glass over a silicon substrate to define optical waveguides. One layer of glass having a relatively high refractive index is known as the core layer and is surrounded by glass known as the clad layers having a lower index of refraction. During operation, light is confined in the core glass because of the lower refractive index of the surrounding clad layers and, as a consequence, the configuration of the core layer defines the path of the light. Photolithographic masking and etching can be used to define the waveguide paths with precision, and the Henry et al. paper describes how various optical devices such as couplers and polarization splitters can be fabricated in this manner.

The use of a planar optical waveguide implies that light is introduced into one end of the waveguide and extracted from the other end. Efficient coupling of light to and from a waveguide normally requires a lens, and for this purpose properly located small spherical lenses of glass, ball lenses, are often used. If the separate fabrication, alignment and packaging of glass lenses could be avoided, planar optical waveguides would be easier and less expensive to make and use.

SUMMARY OF THE INVENTION

In one embodiment of the invention, a planar optical waveguide is made by forming successively of light transmitting material a first clad layer, a core layer and a second clad layer. The core layer has a higher refractive index than that of the first and second clad layers such that the core layer can transmit light along its length as an optical waveguide. A sacrificial layer is formed surrounding at least a first end portion of the core layer. The sacrificial layer is removed, as by selective etching, such that the first end portion of the core layer is separated from the first and second clad layers. With the end portion so isolated, a lens can be formed on it such that light may be more effectively coupled to or from the core layer. Preferably, the lens is formed by heating the structure sufficiently to form a meniscus on the free end of the core layer and then cooling it before the remainder of the core layer flows or melts. The cooling hardens the meniscus such that it constitutes a lens.

As will become clear later, the invention avoids the need for separately aligned ball lenses without appreciably adding to the cost of making planar waveguides. The lenses can be formed at the ends of all of the waveguides of an optical circuit simultaneously. These and other objects, benefits and advantages of the invention will be better understood from a consideration of the following detailed description taken in conjunction with the accompanying drawing.

BRIEF DESCRIPTION OF THE DRAWING

FIG. 1 is a schematic sectional view of part of a planar optical circuit at one stage of its fabrication;

FIG. 2 is a view taken along lines 2—2 of FIG. 1;

FIGS. 3, 5, 7 and 9 are views of the circuit of FIG. 1 at subsequent stages of fabrication; and FIGS. 4, 6, 8 and 10 are views of the circuit of FIG. 2 at subsequent stages of fabrication which respectively correspond to the stages depicted in FIGS. 3, 5, 7 and 9.

DETAILED DESCRIPTION

The drawings are intended to be schematic, are not necessarily to scale, and may be dimensionally distorted to aid in clarity of exposition. FIGS. 1, 3, 5, 7 and 9 are front sectional views showing successive stages in the fabrication of a planar optical waveguide in accordance with one embodiment of the invention, while FIGS. 2, 4, 6, 8 and 10 are corresponding side sectional views. Referring now to FIGS. 1 and 2, a silicon dioxide layer 11 is first made over a silicon substrate 12. Over the layer 11, a glass clad layer 13 is formed, which may have a thickness of five microns. The layer 13 may be of a glass known as P-TEOS, which means that it is a glass doped with phosphorus that has been deposited by a reaction of tetraethylorthosilicate (TEOS), as is known in the art. Layer 13 may be doped to a concentration of two percent by weight of phosphorus so as to have a refractive index of approximately 1.4604.

Over layer 13 is formed a layer of polysilicon which is masked and etched to form a pair of discrete layers 14, which correspond to the ends of optical waveguides to be formed. Polysilicon deposition is well known and widely used in the integrated circuit art and therefore will not be described in detail; polysilicon can be selectively etched using ethylene diamine pyrocatechol. Layers 14 eventually will be etched out and therefore constitute sacrificial layers. Over the layers 14 is formed a waveguide core layer 15 which is masked and etched to form a desired waveguide pattern. The core layer 15 may be phosphosilicate glass, doped with phosphorus to a concentration of eight percent so as to have an index of refraction of approximately 1.4723, and it may have a thickness of five microns.

Referring to FIGS. 3 and 4, over the core layer 15 is formed another layer 17 of polysilicon which is masked and etched such that, together with polysilicon layer 14, it forms a sacrificial member that completely surrounds the two ends of the core layer 15. Layers 14 and 17 may have a thickness of 0.5–1.0 microns.

Referring to FIGS. 5 and 6, a second clad layer 18 is formed over the sacrificial layer 17 and the core layer 15. Clad layer 17 may be identical in composition to the clad layer 13 and have a thickness of fifteen microns. The clad layer 18 may be masked and etched along with core layer 13 so that they together surround the core layer 15 as shown. Alternatively, layers 18 and 13 may be left intact without masking and etching, if so desired. It is important only that the ends of the core layer 15 be exposed as shown in FIG. 6. As is known, glass can be patterned by reactive ion etching.

Referring to FIGS. 7 and 8, the next step is to etch away selectively the polysilicon layers 14 and 17, which leaves each of the ends of the core layer 15 surrounded by an annular cavity 20. The cavities separate the two ends of the core layer 15 from the surrounding clad layers 13 and 18.

Referring to FIGS. 9 and 10, the next step is to heat the structure to the reflow temperature of the glass layer 15. For phosphosilicate glass, this would be approximately one thousand degrees Centigrade, preferably in a phosphorus ambient. The first consequence of heating to this temperature is the formation of meniscus 22 at the exposed ends of core layer 15. This occurs first because the exposed ends reach the reflow temperature before the interior does. The meniscus inherently forms, because of surface tension, a curved or spherical lens configuration. Immediately after the formation of the meniscus 22, the structure is cooled to stabilize the structure by solidifying the softened elements. As a consequence, the meniscus portions 22 each harden and retain the spherical configuration that is desired for its use as a lens. The curvature of the lens depends on the protrusion dimension δ, as indicated in FIG. 8. Dimension δ may illustratively be one to five microns. Thereafter, light directed on either of the curved end surfaces 22, or lenses, of the core layer 15 is refracted and focused to the core layer as is desirable for optimum optical coupling and propagation.

Our experiments show that it is not necessary for the surface on which each meniscus 22 is formed be a horizontal surface, and it can in fact be vertical as shown. If the structures are not heated for too long, the surface tension effects at the end of the core layer are much greater than gravitational effects, and gravity does not affect the symmetrical configuration of the meniscus. Of course, one may form the meniscus on a horizontal surface if desired.

In most practical versions, the core layer 15 would describe an appropriate path for performing various optical device functions. Several optical waveguides can be formed simultaneously on a single substrate. Polysilicon is convenient to use for the sacrificial layers because of ease of deposition and selective etch, but other materials could be used. It is not necessary that the waveguides be of the particular kind of glass described or that they even be of glass. The patent of Burack et al., U.S. Pat. No. 5,165,959, granted Nov. 24, 1992, for example, describes how planar optical waveguides can be made of polymer materials. For such purposes, the sacrificial layers could be made of a deposited oxide such as silicon dioxide, which can be selectively etched, for example, by buffered HF without affecting the polymer. Various other embodiments and modifications may be made by those skilled in the art without departing from the spirit and scope of the invention.

We claim:

1. A method for making an optical waveguide comprising the steps of: forming successively of light transmitting materials a first clad layer, a core layer upon the first clad layer, and a second clad layer upon the core layer, the core layer having a higher refractive index than that of the first and second clad layers to form an optical waveguide, whereby the core layer can transmit light along a length thereof; wherein the improvement comprises:
   forming a sacrificial member of polysilicon surrounding at least a first end portion of the core layer;
   the first and second clad layers and the core layer are made of glass;
   selectively removing the sacrificial member, whereby the first end portion of the core layer is separated from the first and second clad layers;
   and forming a lens on the first end portion of the core layer, whereby light may be more effectively coupled to or from the core layer.

2. The method of claim 1 wherein:
   the selective removal is made by exposing the first end portion to ethylene-diamine pyrocatechol which selectively dissolves the sacrificial member without substantially affecting the first clad layer, the core layer, or the second clad layer.

3. The method of claim 2 wherein:
   the first clad layer, the core layer and the second clad layers are layers of phosphosilicate glass, the first clad layer being formed on a silicon dioxide layer which, in turn, is formed on a silicon substrate;
   a first portion of the sacrificial member is formed on the first clad layer, and a first end portion of the core layer is formed on the first portion of the sacrificial member;
   and after the core layer is formed, a second portion of the sacrificial member is formed on the core layer such that the first and second portions of the sacrificial layer together surround the first end portion of the core layer.

4. A method for making a planar optical waveguide comprising the steps of:
   forming on a substrate a first clad layer of glass;
   forming over a portion of the first clad layer a first sacrificial layer of polysilicon;
   forming over the first sacrificial layer and part of the first clad layer a core layer of glass;
   masking and etching the core layer to define a waveguide core having a first end portion including a free end overlying the first sacrificial layer;
   forming over the first end portion of the waveguide core a second sacrificial layer of polysilicon which, together with the first sacrificial layer, substantially surrounds the first end portion of the waveguide core;
   forming over the second sacrificial layer and part of the waveguide core a second clad layer of glass to form an optical waveguide;
   the waveguide core and the first and second clad layers being made of light transmitting glasses;
   selectively etching the first and second sacrificial layers, whereby the first end portion of the waveguide core is surrounded by a cavity portion;
   heating the waveguide core sufficiently to form a meniscus on the free end of the first end portion of the waveguide core;
   and cooling the free end of the first end portion of the waveguide core to harden it and form a lens.

5. The method of claim 4 wherein:
   simultaneously with the forming of the lens on the free end of the waveguide core, a second lens is formed on a second end portion of the waveguide core.

6. The method of claim 5 wherein:

the first clad layer is formed on a silicon dioxide layer which, in turn, is formed on a silicon substrate;

the first sacrificial layer is masked and etched to leave portions thereof, each of which corresponds to an end of a waveguide core;

the core layer is deposited on both the first sacrificial layer and the first clad layer, and is masked and etched to form the waveguide core defining at least one optical path;

the second sacrificial layer is masked and etched to make portions, each of which is substantially coextensive with a corresponding first sacrificial layer portion;

the second clad layer overlies the second sacrificial layer and the waveguide core;

and the waveguide core has a higher refractive index than that of the first and second clad layers.

* * * * *